United States Patent [19]

Kilgar

[11] Patent Number: 5,338,265

[45] Date of Patent: Aug. 16, 1994

[54] EMERGENCY DRIVE BELT APPARATUS

[76] Inventor: Mark R. Kilgar, 148 Olive Ave., Oshawa, Ontario, Canada, L1H 2P2

[21] Appl. No.: 16,996

[22] Filed: Feb. 12, 1993

[51] Int. Cl.$^5$ .............................................. F16G 7/00
[52] U.S. Cl. ................................................ 474/256
[58] Field of Search ................ 474/250, 253, 255–257, 474/264, 265, 268

[56] References Cited

U.S. PATENT DOCUMENTS

| | | | |
|---|---|---|---|
| 4,193,312 | 3/1980 | Cicognani | 474/250 X |
| 4,254,666 | 3/1981 | Seredick | 474/250 X |
| 4,437,849 | 3/1984 | Berg | 474/256 |
| 4,445,877 | 5/1984 | Love et al. | 474/255 |
| 4,705,495 | 11/1987 | Madion | 474/265 X |
| 4,846,770 | 7/1989 | Lane | 474/253 |

*Primary Examiner*—Ramon S. Britts
*Assistant Examiner*—Roger J. Schoeppel

[57] ABSTRACT

A new and improved emergency drive belt apparatus includes a flexible belt member, a first connector assembly attached to the first end of the belt member, a second connector assembly attached to the second end of the belt member, and a locking member capable of being positioned over the first connector assembly and the second connector assembly for locking the connector assemblies together to form the belt member into a continuous loop. The first and second connector assemblies have respective teeth. When the respective connector assemblies are connected together, the respective teeth are meshed together, and the locking member is in its locking position. The first connector assembly may further include a releasable assembly for selectively clamping the first end of the belt member in, or releasing the first end from, the first connector assembly. In the releasable assembly, a screw-controlled clamping plate may also include a cutting element for nicking or cutting off a portion of the belt member when the clamping plate is screwed onto the first end of the belt member. A plurality of first threads may be located on the first connector assembly, a plurality of second threads may be located on the second connector assembly, and a third threaded portion may be located on an interior surface of the locking member. The locking member is installed on the first and second connector assemblies by rotating the third threaded portion onto the first and second threaded portions so that the belt member forms a continuous loop.

7 Claims, 4 Drawing Sheets

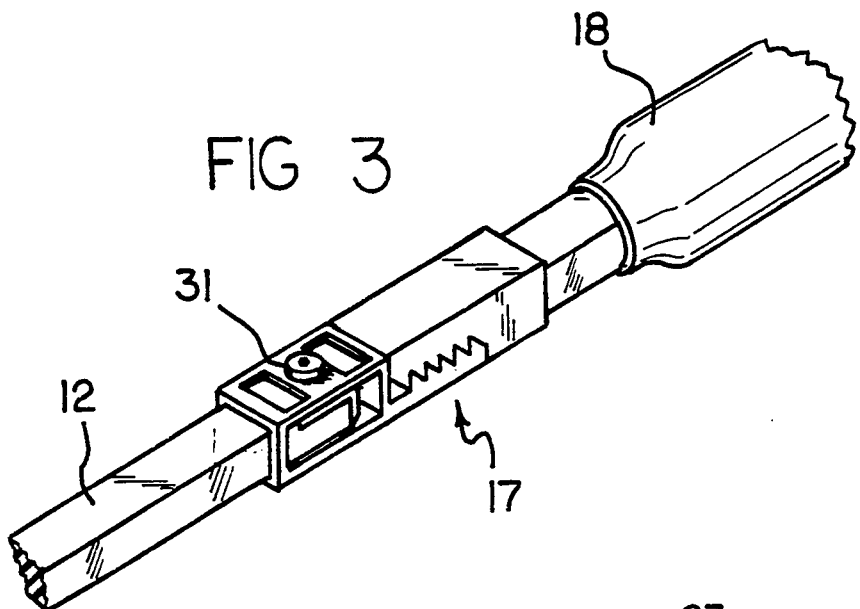
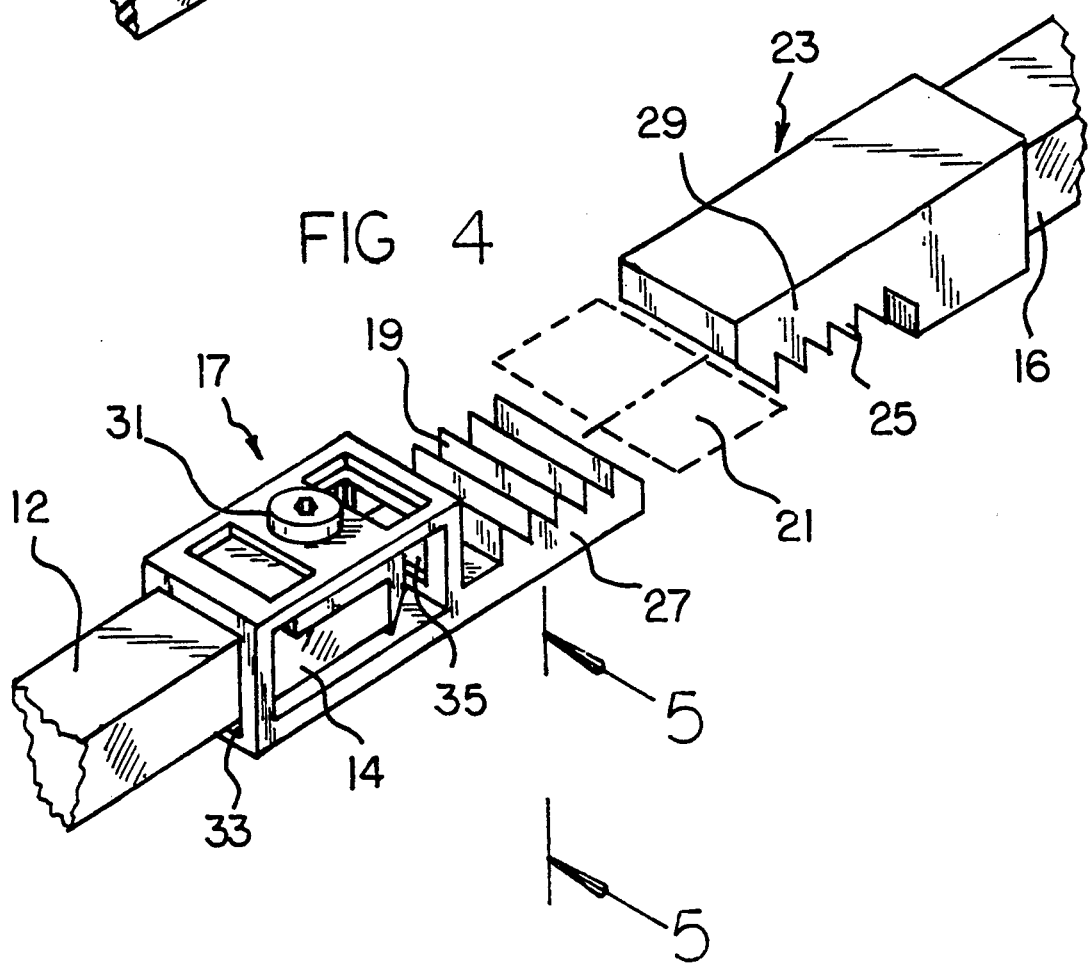

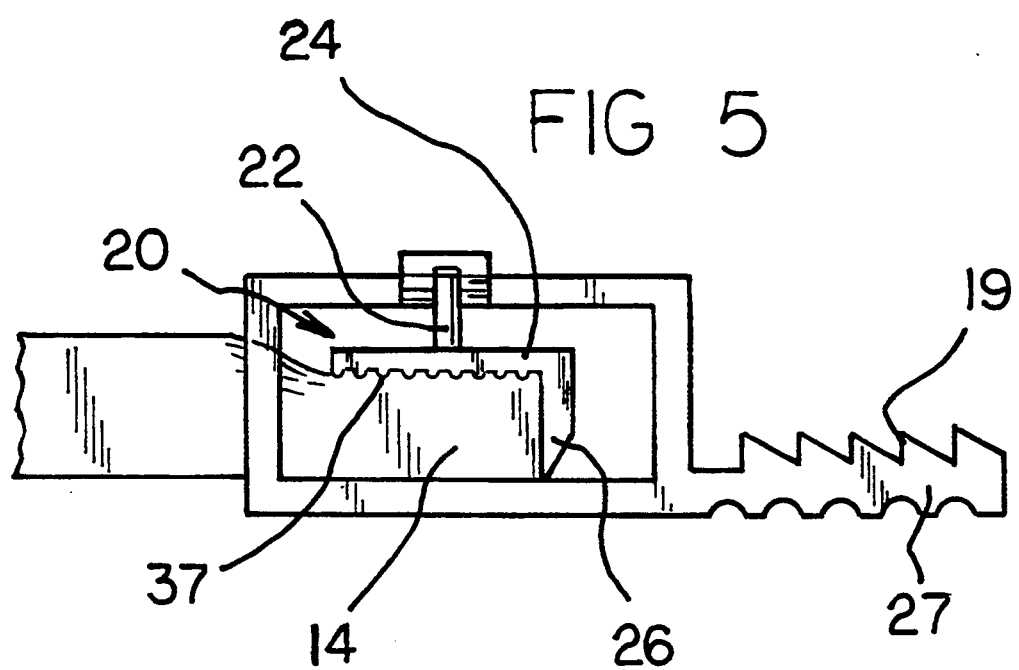

EMERGENCY DRIVE BELT APPARATUS

BACKGROUND OF THE INVENTION

1. Field of the Invention

The present invention relates generally to drive belts for motorized apparatus, and more particularly, to a temporary drive belt that can be installed without the use of a wrench.

2. Description of the Prior Art

Drive belts, such as fan belts to be installed on an automobile engine in emergency situations when a conventional fan belt breaks or is in an unsafely weakened condition, are well known in the art. For example, the following U.S. Pat. Nos. disclose emergency drive belts: 3,747,165 of Brown; 4,207,776 of Helt et al; 4,376,631 of Garza; 4,795,410 of Alderfer; and 4,861,322 of Reddick. The belt of Brown requires an extraneous razor blade to cut off excess belt material when the emergency belt is installed. The belt of Helt et al requires a plurality of connectable links to obtain a belt of the desired length. The belt of Garza employs a plurality of teeth projecting from a rigid external sleeve to dig into the two ends of the belt and retain the two ends of the belt to form an endless loop. No external force is used to assure that the teeth continue to dig into belt material under the stress of use on the engine. Also, the digging into the belt ends can cause damage to the belt ends. The belt of Alderfer requires a tubular belt and uses a barbed shank, and end of which is inserted into each of the respective ends of the tubular belt. The barbs dig into the two ends of the tubular belt. The tubular belt is hollow, and as such, contains a reduced amount of belt material, whereby the strength of the belt is diminished. Moreover, the hollow belt undergoes an excessive amount of flexing, compared with a solid belt, and the excessive flexing can contribute to excessive heat build up and premature wear. The belt of Reddick uses a simple coupling strip of material for connecting two ends of the belt. No outside force is exerted on the coupling strip. As a result, the strength of the connection between the two ends of the belt may be overcome by the stresses of an operating engine, especially when the engine is started from a non-running condition.

Thus, while the foregoing body of prior art indicates it to be well known to use emergency drive belts generally, the provision of a simple, cost effective, easily installed, and secure device is not contemplated. The prior art described above teaches the use of an extraneous razor blade to cut off excess belt material when the emergency belt is installed. Also, the prior art discloses a plurality of connectable links to obtain a belt of the desired length. The prior art provides digging into the belt ends with barbs which can cause damage to the belt ends when the belt is in use. In addition, the prior art discloses a hollow belt which may undergo an excessive amount of flexting, compared with a solid belt, and the excessive flexing may contribute to excessive heat build up and premature wear. The prior art provides a connection between two ends of a belt in which the strength of the connection between the two ends of the belt may be overcome by the stresses of an operating engine, especially when the engine is started from a non-running condition. The foregoing disadvantages are overcome by the unique emergency drive belt apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved emergency drive belt apparatus which includes a flexible belt member, a first connector assembly attached to the first end of the belt member, a second connector assembly attached to the second end of the belt member, and a locking member, located on the belt member, capable of being positioned over the first connector assembly and the second connector assembly for locking the connector assemblies together to form the belt member into a continuous loop.

The first connector assembly includes a first longitudinally projecting portion which includes a plurality of first teeth which project toward an imaginary medial plane that bisects the flexible belt member in a longitudinal direction. The second connector assembly includes a second longitudinally projecting portion which includes a plurality of second teeth which project toward the imaginary medial plane. When the respective connector assemblies are connected together, the first and second teeth are meshed together and the locking member is in its locking position.

The first connector assembly may further include a releasable assembly for selectively clamping the first end of the belt member in, or releasing the first end from, the first connector assembly. The releasable assembly includes a screw and a screw-controlled clamping plate. The screw-controlled clamping plate may also include a cutting element which projects perpendicularly from one end of the clamping plate toward the belt member, such that the cutting element is capable of nicking or cutting off a portion of the belt member when the clamping plate is screwed onto the first end of the belt member.

A plurality of first threads may be located on the first longitudinally projecting portion, a plurality of second threads may be located on the second longitudinally projecting portion, and a third threaded portion may be located on an interior surface of the locking member. The locking member is installed on the first longitudinally projecting portion and the second longitudinally projecting portion by rotating the third threaded portion onto the first and second threaded portions, whereby the first end and the second end of the belt member are locked together to form the belt member into a continuous loop.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved emergency drive belt apparatus which has all of the advantages of the prior art and none of the disadvantages.

It is another object of the present invention to provide a new and improved emergency drive belt apparatus which may be easily and efficiently manufactured and marketed.

It is a further object of the present invention to provide a new and improved emergency drive belt apparatus which is of durable and reliable construction.

An even further object of the present invention is to provide a new and improved emergency drive belt apparatus which is susceptible of a low cost of manufacture with regard to both materials and labor, and which accordingly is then susceptible of low prices of sale to the consuming public, thereby making such emergency drive belt apparatus available to the buying public.

Still yet a further object of the present invention is to provide a new and improved emergency drive belt apparatus which does not require an extraneous razor blade to cut off excess belt material when the emergency belt is installed.

Still another object of the present invention is to provide a new and improved emergency drive belt apparatus which does not require a plurality of connectable links to obtain a belt of the desired length.

Yet another object of the present invention is to provide a new and improved emergency drive belt apparatus which avoids having barbs digging into the belt ends which can cause damage to the belt ends.

Even another object of the present invention is to provide a new and improved emergency drive belt apparatus that is not hollow and thereby avoids undergoing an excessive amount of flexing and premature wear compared with a solid belt.

Still a further object of the present invention is to provide a new and improved emergency drive belt apparatus which employs a strong connection between the two ends of the belt so that the connection is not overcome by the stresses of an operating engine, especially when the engine is started from a non-running condition.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is an enlarged perspective view of the embodiment of the emergency drive belt apparatus of the invention shown in FIG. 2 having its sleeve removed from its locking position.

FIG. 4 is an enlarged perspective view of the embodiment of the emergency drive belt apparatus of the invention shown in FIG. 3 having its two ends disconnected.

FIG. 5 is a cross-sectional view on one end of the embodiment of the invention shown in FIG. 4, taken along line 5—5 of FIG. 4.

DESCRIPTION OF THE PREFERRED EMBODIMENT

Figure 1:
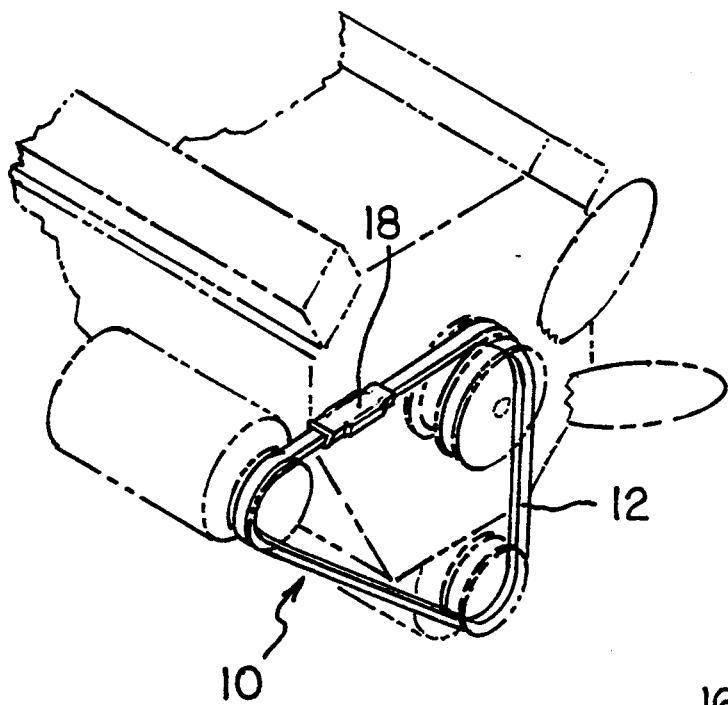
FIG. 1 is a perspective view showing a first preferred embodiment of the emergency drive belt apparatus of the invention installed on an automotive engine and routed around pulleys for the crankshaft, the radiator fan, and the alternator.

With reference to the drawings, a new and improved emergency drive belt apparatus embodying the principles and concepts of the present invention will be described.

Turning initially to FIGS. 1–5, there is shown a first exemplary embodiment of the emergency drive belt apparatus of the invention generally designated by reference numeral 10. In its preferred form, emergency drive belt apparatus 10 includes a flexible belt member 12 which includes a first end 14 and a second end 16. A first connector assembly 17 is attached to the first end 14 of the belt member 12; and the first connector assembly 17 includes a first longitudinally projecting portion 27 which includes a plurality of first triangular-shaped teeth 19 which project toward an imaginary medial plane 21 that bisects the flexible belt member 12 in a longitudinal direction.

A second connector assembly 23 is attached to the second end 16 of the belt member 12; and the second connector assembly 23 includes a second longitudinally projecting portion 29 which includes a plurality of second triangular-shaped teeth 25 which project toward the imaginary medial plane 21. The second teeth 25 are complementary to the first teeth 19. The respective first connector assembly 17 and the first teeth 19 and the respective second connector assembly 23 and the second teeth 25 are capable of selectively being either connected together or unconnected from each other. A locking member 18 is located on the belt member 12, capable of being positioned over the first connector assembly 17 and the second connector assembly 23 when the connector assemblies are connected together, the locking member 18 serving to lock the first teeth 19 of the first connector assembly 17 and the second teeth 25 of the second connector assembly 23 together, thereby serving to lock the first end 14 and second end 16 together to form the belt member 12 into a continuous loop. The first teeth 19 and the second teeth 25 have a triangular cross-sectional shape.

Figure 2:
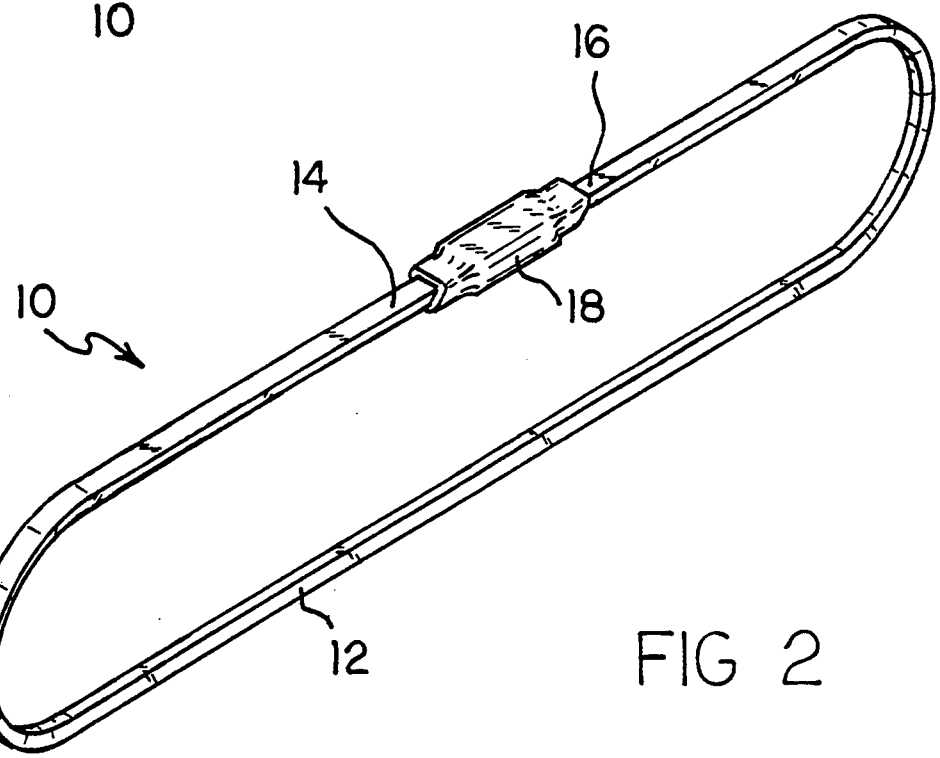
FIG. 2 is an enlarged perspective view of the embodiment of the emergency drive belt apparatus of the invention shown in FIG. 1 removed from the engine and having its sleeve in its locking position.

The locking member 18 is comprised of a flexible sleeve 18. Before the first and second connector assemblies 17 and 23 are connected together, the flexible sleeve 18 is located on the second end 16 of the belt member 12 (as shown in FIG. 3). Once the first and second connector assemblies are connected together, the locking member 18 fits tightly around the connected assemblies (as shown in FIGS. 1 and 2).

The first connector assembly 17 further includes a releasable assembly 20 for selectively clamping the first end 14 in, or releasing the first end 14 from, the first connector assembly 17. The releasable assembly 20 includes a screw 22 and a screw-controlled clamping plate 24. The screw 22 is guided by a hole in an upper planar element 31 of the first connector assembly 17. The screw 22 may have any suitable head and is shown to have a hexagonal socket for a hexagonal Allen wrench. The clamping plate 24 has a bottom surface which includes a plurality of ridges 37 which assist in gripping the first end 14 of the belt member 12.

The screw-controlled clamping plate 24 further includes a cutting element 26 which projects perpendicularly from one end of the clamping plate 24 toward the belt member 12, such that the cutting element 26 is capable of nicking or cutting off a portion of the belt member 12 when the clamping plate 24 is screwed onto the first end 14 of the belt member 12. More specifically, a first opening 33 and a second opening 35 are provided in the first connector assembly 17. To adjust a long belt to a specific engine, the main body of the belt member 12 is routed around the appropriate pulleys on the engine, and a free end of the belt member 12 is passed through both openings 33 and 35. The second connector assembly 23 is brought near the first connector assembly 17 to determine the approximate length of the belt member 12 needed for the specific application. When the appropriate belt length is determined, the screw is turned, and the belt member 12 is either nicked or completely cut through by the cutting element 26. If the belt member 12 is merely nicked by the cutting element 26, a saw, a razor blade, or snips or other suitable cutting means (not shown) may be used to complete the cut. Alternatively, the cutting element 26 may cut clear through the belt member 12. Whether the belt member 12 is merely nicked or cut completely through by the cutting element 26 depends upon the strength of the belt member 12 and the rigidity of the first connector assembly 17. In either case, the excess length of the belt member is cut off of the remainder of the belt member.

Figure 6:
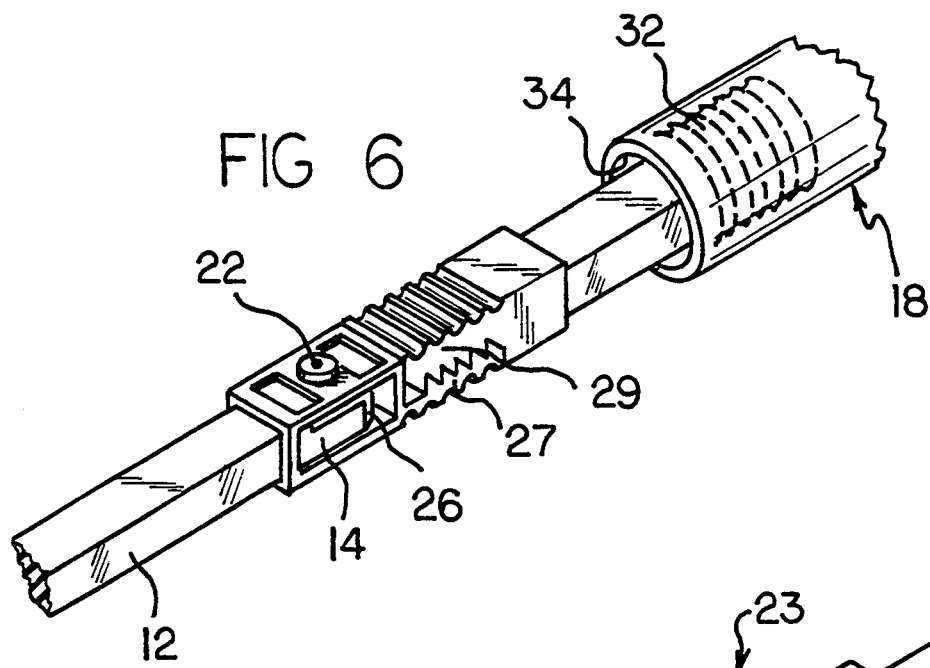
FIG. 6 is a perspective view of the a second embodiment of the emergency drive belt apparatus of the invention having a threaded sleeve removed from its locking position upon complementary threads on the locking ends.
Figure 7:
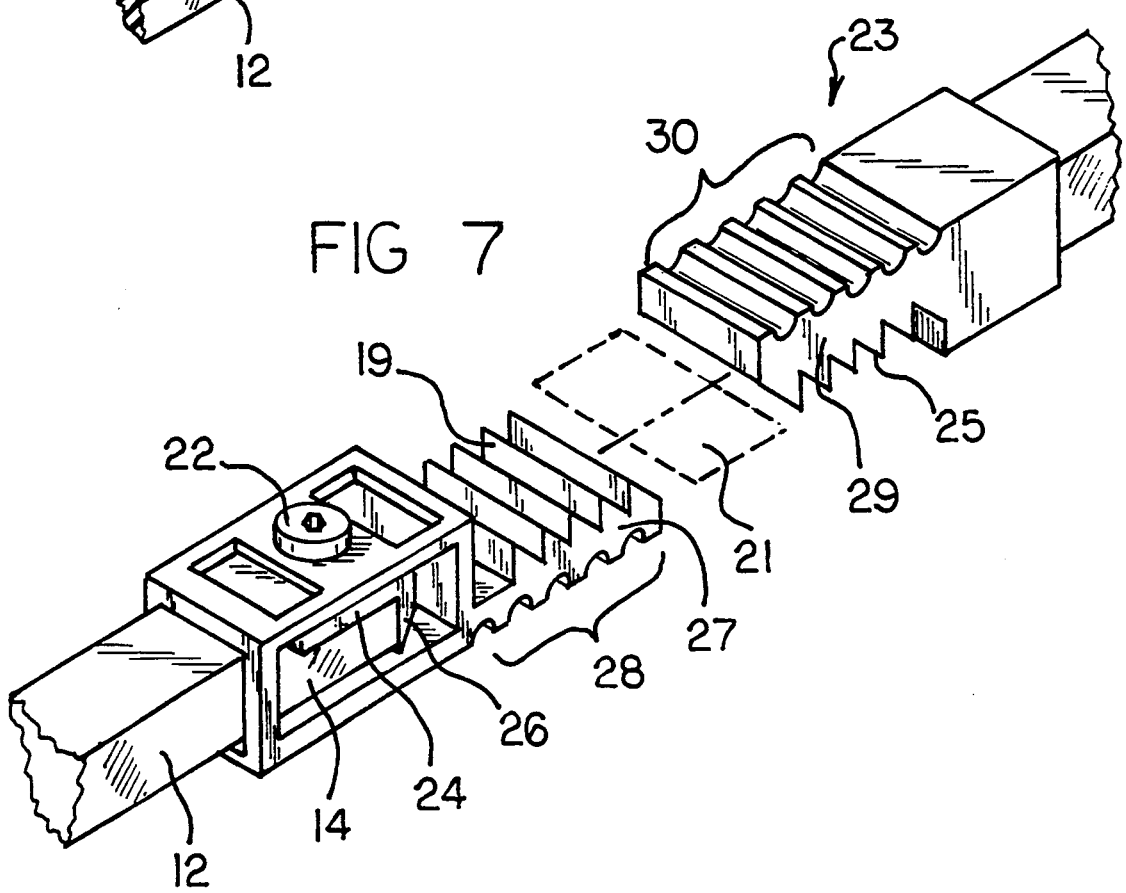
FIG. 7 enlarged perspective view of the embodiment of the emergency drive belt apparatus of the invention shown in FIG. 6 having its two ends disconnected.

Turning to FIGS. 6-7, a second embodiment of the emergency drive belt apparatus 10 of the invention is shown. Reference numerals are shown that correspond to like reference numerals that designate like elements shown in the other figures. In addition, in FIGS. 6-7, a plurality of first threads 28 are located on the first longitudinally projecting portion 27 of the first connector assembly 17 and are directed away from the first teeth 19 and the imaginary median plane 21. A plurality of second threads 30 are located on the second longitudinally projecting portion 29 of the second connector assembly 23 and are directed away from the second teeth 25 and the imaginary median plane 21. A third threaded portion 32 is located on an interior surface 34 of the locking member 18. The locking member 18 is installed on the first longitudinally projecting portion 27 and the second longitudinally projecting portion 29 by rotating the third threaded portion 32 onto the first and second threaded portions 28 and 30, respectively, whereby the first end 14 and the second end 16 are locked together to form the belt member 12 into a continuous loop.

Except for the screw, the clamping plate, and the cutting element, the components of the emergency drive belt apparatus of the invention can be made from inexpensive, durable, flexible rubber compositions. The screw, the clamping plate, and the cutting element are preferably made from materials, such as hard metal, which are harder than the other materials comprising the emergency drive belt apparatus of the invention.

It is apparent from the above that the present invention accomplishes all of the objects set forth by providing a new and improved emergency drive belt apparatus that is low in cost, relatively simple in design and operation, and which may advantageously be used as an emergency drive belt for an engine.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved emergency drive belt apparatus, comprising:
 a flexible belt member which includes a first end and a second end,
 a first connector assembly attached to said first end of said belt member, wherein said first connector assembly includes a first longitudinally projecting portion which includes a plurality of first teeth which project toward a imaginary medial plane that bisects said flexible belt member in a longitudinal direction;

a second connector assembly attached to said second end of said belt member, wherein said second connector assembly includes a second longitudinally projecting portion which includes a plurality of second teeth which project toward the imaginary medial plane that bisects said flexible belt member in a longitudinal direction, said second teeth being complementary to said first teeth, wherein said respective first connector assembly and said first teeth and said respective second connector assembly and said second teeth are capable of selectively being either connected together or unconnected from each other; and a locking member, located on said belt member, capable of being positioned over said first connector assembly and said second connector assembly when said connector assemblies are connected together, said locking member serving to lock said first teeth of said first connector assembly and said second teeth of said second connector assembly together, thereby serving to lock said first end and second end together to form said belt member into a continuous loop.

2. The apparatus described in claim 1 wherein said first teeth and said second teeth have a triangular cross-sectional shape.

3. The apparatus described in claim 1 wherein said locking member is comprised of a flexible sleeve which fits tightly around said first connector assembly and said second connector assembly when said first and second connector assemblies are connected together.

4. The apparatus described in claim 1 wherein said first connector assembly further includes releasable assembly means for selectively clamping said first end in, or releasing said first end from, said first connector assembly.

5. The apparatus described in claim 4 wherein said releasable assembly means includes a screw and a screw-controlled clamping plate.

6. The apparatus described in claim 5 wherein said screw-controlled clamping plate includes a cutting element which projects perpendicularly from one end of said clamping plate toward said belt member, such that said cutting element is capable of cutting off a portion of said belt member when said clamping plate is screwed onto said first end of said belt member.

7. The apparatus described in claim 1, further comprising:

a plurality of first threads located on said first longitudinally projecting portion of said first connector assembly and directed away from said first teeth and said imaginary median plane;

a plurality of second threads located on said second longitudinally projecting portion of said second connector assembly and directed away from said second teeth and said imaginary median plane; and a third threaded portion located on an interior surface of said locking member;

wherein said locking member is installed on said first longitudinally projecting portion and said second longitudinally projecting portion by rotating said third threaded portion onto said first and second threaded portions and, respectively, whereby said first end and said second end are locked together to form said belt member into a continuous loop.

* * * * *